United States Patent
Franke et al.

(10) Patent No.: US 10,429,209 B2
(45) Date of Patent: Oct. 1, 2019

(54) POSITION DETERMINING UNIT

(71) Applicant: TDK—Micronas GmbH, Freiburg (DE)

(72) Inventors: Joerg Franke, Freiburg (DE); Klaus Heberle, Emmendingen (DE)

(73) Assignee: TDK-Micronas GmbH, Freiburg (DE)

( * ) Notice: Subject to any disclaimer, the term of this patent is extended or adjusted under 35 U.S.C. 154(b) by 137 days.

(21) Appl. No.: 15/449,650

(22) Filed: Mar. 3, 2017

(65) Prior Publication Data
US 2017/0254669 A1 Sep. 7, 2017

(30) Foreign Application Priority Data
Mar. 3, 2016 (DE) .......... 10 2016 002 488

(51) Int. Cl.
*G01D 5/14* (2006.01)
*G01D 5/251* (2006.01)

(52) U.S. Cl.
CPC .......... *G01D 5/145* (2013.01); *G01D 5/2515* (2013.01)

(58) Field of Classification Search
CPC ............... G01D 5/145; G01D 5/2515
See application file for complete search history.

(56) References Cited

U.S. PATENT DOCUMENTS

| | | | | |
|---|---|---|---|---|
| 4,367,506 A * | 1/1983 | Lapsker | ........... | G01R 19/16576 340/648 |
| 5,608,211 A * | 3/1997 | Hirono | ........... | G01B 11/24 250/234 |
| 5,668,533 A * | 9/1997 | Jackson, Jr. | ....... | H01H 36/0026 335/205 |
| 8,122,159 B2 | 2/2012 | Monreal | | |
| 8,823,193 B1 * | 9/2014 | Yazghi | ........... | F03D 7/048 290/44 |
| 2006/0202737 A1 * | 9/2006 | Walter | ........... | H03K 17/063 327/427 |
| 2008/0068007 A1 * | 3/2008 | Hoshiya | ........... | B82Y 25/00 324/207.21 |
| 2009/0224750 A1 * | 9/2009 | Hosek | ........... | G01B 7/003 324/207.13 |
| 2010/0026369 A1 * | 2/2010 | Hofmayer | ........... | G01D 3/08 327/379 |

(Continued)

FOREIGN PATENT DOCUMENTS

| | | |
|---|---|---|
| DE | 200 09 155 U1 | 9/2000 |
| DE | 11 2009 004 394 B4 | 12/2015 |
| WO | WO 2015/192965 A1 | 12/2015 |

*Primary Examiner* — Akm Zakaria
(74) *Attorney, Agent, or Firm* — Muncy, Geissler, Olds & Lowe, P.C.

(57) ABSTRACT

A position determining unit is provided that has a number of sensor units arranged at positions along a path, and a transducer. Each sensor unit has a carrier, a first and second supply voltage connection, a switching output, a measuring unit and a bias magnet comprising two poles. The measuring unit is arranged on the carrier and has at least one magnetic field sensor, wherein the switching output is switched into an On or Off-state as a function of a threshold value exceeding or falling short of a sensor signal. The first supply voltage connection of each sensor unit is connected to a supply voltage, wherein a first sensor unit is arranged at a beginning of the path and a last sensor unit is arranged at the end of the path. The second supply voltage connection of the first sensor unit is connected to a reference potential.

20 Claims, 2 Drawing Sheets

(56) References Cited

U.S. PATENT DOCUMENTS

| | | |
|---|---|---|
| 2012/0136541 A1 | 5/2012 | Inamoto |
| 2013/0066587 A1* | 3/2013 | Kalathil .................. G01D 5/06 702/150 |
| 2015/0229255 A1* | 8/2015 | Wang ....................... H02P 7/18 318/461 |
| 2017/0138764 A1 | 5/2017 | Tekin |

* cited by examiner

POSITION DETERMINING UNIT

This nonprovisional application claims priority under 35 U.S.C. § 119(a) to German Patent Application No. 10 2016 002 488.7, which was filed in Germany on Mar. 3, 2016, and which is herein incorporated by reference.

BACKGROUND OF THE INVENTION

Field of the Invention

The present invention relates to a position determining unit.

Description of the Background Art

A sensor unit for determining a linear position along a path is known from WO 2015/192965 A1. The sensor unit has a plurality of Hall switches arranged in a row along the path, a transducer movable above the row of Hall switches, a plurality of series-connected resistors, and a voltage measuring unit, wherein each Hall switch has a voltage node lying between in each case two resistors. By means of the voltage drop determined by the voltage measurement unit, the position of the transducer is determined above the lined up adjusted Hall switches.

The master-slave system for several sensors is described in DE 11 2009 004 394 B4, which corresponds to U.S. Pat. No. 8,122,159, wherein the sensors are arranged in a daisy-chain arrangement.

SUMMARY OF THE INVENTION

It is therefore an object of the invention to provide a device which further develops the prior art.

In an exemplary embodiment of the invention a position determining unit is provided, wherein said position determining unit has a number of N similar sensor units, which are arranged at predetermined intervals at positions along a preferably straight or annular path, a transducer, and a current measuring unit.

The transducer is movable along the path and has a first end and a length extending parallel to the path from the first end. The transducer comprises a ferromagnetic material.

Each sensor unit can have a carrier, a supply voltage connection, a second supply voltage connection, a switching output, a measuring unit with a switching output, and a bias magnet with a first pole and a second pole.

In order to provide a sensor signal dependent on the measuring signal of the magnetic field sensor, the measuring unit has at least one magnetic field sensor and is arranged with a lower side on an upper side of the carrier.

The switching output is switched to an On-state or an Off-state as a function of a threshold value exceeding or a threshold value falling below the sensor signal. The first supply voltage connection of each sensor unit is connected to a supply voltage. A first sensor unit is arranged at a beginning of the path and a last sensor unit at an end of the path.

The first sensor unit is connected by means of the second supply voltage connection to a reference potential, e.g., to a ground potential, and has a power consumption Isup.

The second supply voltage connections of the further sensor units are in each case connected to the switching output of the preceding sensor unit, wherein the respective further sensor unit can be switched on or off by means of the switching output of the preceding sensor unit and the respective further sensor unit has a power consumption Isup in the switched-on state.

A current measuring unit is arranged before the first supply voltage connection of the first sensor unit or before the second supply voltage connection of the first sensor unit.

The power consumption Isup of all switched-on sensor units contribute to an aggregate current Isum measured by means of the current measuring unit, wherein the aggregate current Isum is a multiple of the power consumption Isup and is proportional to a position of the first end of the transducer.

It should be noted that the sensor units equipped with bias magnets detect a change in the bias magnetic field by means of a transducer comprising ferromagnetic material.

The sensor signal is detected by means of the at least one magnetic field sensor of the measuring unit. The accuracy of the measurement can be increased by the use of two magnetic field sensors. It is also possible to perform differential measurements with two magnetic field sensors. The measuring unit is preferably designed as an integrated circuit on the surface of a semiconductor module.

The cascade-like interconnection of the sensor units is often referred to as a daisy chain. While the first sensor unit is always in the switched-on state when the position determining unit is put into operation, the following sensor units in the daisy chain arrangement are switched on only on account of a threshold value exceeding the sensor signal of the immediately preceding sensor unit. The threshold value exceeding a sensor signal of the respective sensor unit is triggered by the transducer.

For determining the position, the fact is utilized that a switched-on sensor unit, unlike a switched-off sensor unit, has a non-zero power consumption. On the basis of measuring the total power consumption, referred to herein as the aggregate current, the number of switched-on sensor units, and thus the position of the transducer responsible for switching on, can be inferred.

An advantage of the device according to the invention is that there is no need to communicate with the individual sensor units and that the output signals of the sensor units do not need to be evaluated, but instead that the aggregate current and the fixed positions of the sensor units already contain the information about the position of the transducer. This eliminates the need for an elaborate circuit for address allocation and address output.

With the position determining unit according to the invention, path measurements are possible over long ranges, as are necessary, for example, for seat rails in cars or for level indication in fuel tanks.

According to an embodiment, the bias magnet of each sensor unit is arranged in a first direction pointing from the beginning of the path to the end of the path, before or after the measuring unit, on the surface of the carrier, wherein the first pole and the second pole are arranged in succession along the first direction or perpendicular to the first direction.

By means of the above-described arrangement of the bias magnets, measuring units and bias magnets of the sensor units are arranged alternately along the path.

A succession of the poles along the first direction causes the first pole to be aligned with an end face to the measuring unit. As a result, a bias magnetic field, which is parallel to the surface and runs parallel to the surface, is generated on the surface of the measuring unit.

With the succession of the poles in a second direction oriented perpendicular to the first direction, a bias magnetic field running parallel to the second direction and to the surface is generated on the entire surface of the measuring unit. Due to the reversal of the magnetic field, two regions are formed above and/or on the surface of the measuring unit, wherein the magnetic fields of the regions extend respectively exactly opposite.

If two magnetic field sensors are provided, wherein the first magnetic field sensor is arranged in the first region and the second magnetic field sensor is arranged in the second region, an absolute measurement can be carried out. Influences by external magnetic fields such as any kind of interference fields are suppressed.

Without a directional reversal of the bias magnetic field, at least a differential measurement of the magnetic field is possible, that is to say, the detection of changes in the magnetic field.

In an embodiment, the bias magnet of each sensor unit is arranged in a first direction from the beginning of the path to the end of the path adjacent to the measuring unit on the surface of the carrier, wherein the first pole is arranged in the first direction before the second pole, whereby a bias magnetic field running parallel to the surface and to the first direction is generated on the entire surface of the measuring unit.

According to an embodiment, the bias magnet of each sensor unit is U-shaped with two side walls running parallel to one another and a base connecting the two side walls, wherein the two side walls and a part of the base adjoining the side walls form the first pole, and a second part of the base facing away from the side walls forms the second pole, the carrier and the measuring unit are arranged completely between the side walls, and the surface of the carrier is oriented perpendicular to the side walls.

In an embodiment, the bias magnet of each sensor unit is U-shaped with a first side wall, a second side wall running parallel to the first, and a base connecting the first and second side walls, wherein the first side wall and a first part of the base adjoining the first wall form the first pole, and the second side wall and a second part of the base adjoining the second side wall form the second pole, the carrier and the measuring unit are arranged completely between the first and the second side wall, and the surface of the carrier is oriented perpendicular to the first and second side walls. As a result, a bias magnetic field extending parallel to the surface and perpendicular to the side walls is formed on the entire surface of the magnetic field sensor.

In an embodiment, the On-state of the switching output of each sensor unit is switched when a first threshold value is exceeded, or the Off-state of the switching output of each sensor unit is switched when the first threshold value falls short. The length of the transducer extends from the first end of the transducer at least to the first sensor unit, wherein the position of the first end of the transducer in the region of the position $P_m$ of the m-th sensor unit $S_m$ corresponds to an aggregate current $I_{sum}=(m+I)*I_{sup}$.

In the above-described non-inverting embodiment, the first sensor unit is always switched on, while all further sensor units are switched on only if a threshold value of the sensor signal of an immediately preceding sensor unit is exceeded. If the first end of the transducer is moved beyond the first sensor unit, the sensor signal exceeds the first threshold value and switches on the immediately following sensor unit. If the first end of the transducer is moved further beyond the second sensor unit, the immediately following third sensor unit is switched on, etc.

In order to be able to determine a position of the first end of the transducer, it must always be ensured in the non-inverting embodiment that the transducer has a sufficient length so that the transducer always extends from the first end at least beyond the first sensor unit when moving along the entire path, since otherwise all other sensor units are switched off—result of the so-called daisy chain arrangement.

The position of the first end of the transducer can be set between a position 0 before the first sensor unit (switching output of the first sensor unit in the Off-state, $I_{sum}=1*I_{sup}$) and a position PN−1 of the penultimate sensor unit (switching output of the penultimate sensor unit in the On-state, $I_{sum}=N*I_{sup}$).

According to an embodiment for increasing the accuracy of the position determination, each sensor unit has at least a first threshold value and a second threshold value, and the length of the transducer extends from the first end at least up to the first sensor unit, wherein the second threshold value is smaller than the first threshold value, the On-state of the switching output of each sensor unit is switched when the first threshold value is exceeded, the Off-state of the switching output of each sensor unit is switched when the second threshold value falls short, and the On-state of the switching output of each sensor unit is pulse-width-modulated for sensor signals lying between the second threshold value and the first threshold value. A duty cycle of the pulse width modulation is proportional to the sensor signal, wherein the power consumption $I_{pwm}$ of a sensor unit connected to the pulse width modulated switching output is proportional to the duty cycle and smaller than the power consumption $I_{sup}$ in the On-state, and a position of the first end of the transducer in the region of the position of the m-th sensor unit corresponds to an aggregate current $I_{sum}=m*I_{sup}+I_{pwm}$.

In order to ensure reliable imaging of the position by means of the pulse-width-modulated switching of the sensor unit, each sensor unit should achieve nominal power consumption in the shortest possible time. The time until nominal power consumption is reached should preferably be significantly below a period duration of the pulse width modulation. As a result, a sensor unit switched in a pulse-width-modulated manner by means of the switching output of the immediately preceding sensor unit has a power consumption $I_{pwm}$ which is different from zero but is smaller than the power consumption $I_{sup}$ in the fully switched-on state.

The power consumption $I_{pwm}$ is proportional to the duration of the On-state of the pulse width modulated switching output, i.e. to the duty cycle of the pulse width modulation, wherein the duty cycle indicates the ratio of On-state to Off-state within a period of pulse width modulation. A sensor signal lying between the first threshold value and the second threshold value or the level of the sensor signal is mapped to the power consumption $I_{pwm}$ via the duty cycle, and can thus be determined by measuring the aggregate current.

In the pulse-width-modulated, non-inverting embodiment, the aggregate current includes an integer multiple of the power consumption $I_{sup}$ for all the fully-switched sensor units and, if appropriate, a portion $I_{pwm}$ with $0<I_{pwm}<I_{sup}$ of a pulse-width-modulated sensor unit. In addition to an absolute position provided by the integer multiple on a scale rasterized by the sensor intervals, a second position is obtained by means of the rest, wherein the second position contains relative position information on a finer scale.

For the evaluation, the PWM signal is, for example, converted into a linear current or voltage level via a low-pass filter, e.g. by means of a shunt resistor and can, for example, assume real values between 0 and 1 with a resolution of 8 to 16 bits. The relative position determined by means of the PWM signal is thus defined in an analog mode, while the first absolute position is determined in a digital mode (integer multiple).

Alternatively, the sensor units are configured such that for sensor signals located between the first and second sensor signals, each sensor unit controls its own power consumption by pulse width modulation between Isup and 2*Isup instead of switching the switching output in a pulse width modulated manner. As a result, the relative position of the first end of the transducer is mapped over an m-th sensor unit by pulse width modulation of the power consumption of the m-th sensor unit and not by the power consumption of the (m+1)-th sensor unit. However, nothing will change the further evaluation.

Instead of generating the additional current Ipwm by a pulse width modulation of the power consumption of the sensor unit, the current Ipwm, which represents the relative position, is provided in a further alternative embodiment by means of an analog output controlled by a digital-to-analog converter between Isup and 2*Isup.

In an embodiment, the Off-state of the switching output of each sensor unit is switched when a first threshold value is exceeded, the On-state of the switching output of each sensor unit is switched when the first threshold value falls short and the transducer extends from the first end at least along a partial area of the path in the direction of the last sensor unit, wherein a position of the first end of the transducer in the region of the position of the m-th sensor unit corresponds to an aggregate current Isum=m*Isup.

In the inverting embodiment, in the absence of the transducer, all sensor units are switched on since a threshold value falls short for all sensor signals. The transducer causes the sensor units to be switched off, wherein the transducer can have a short length in the inverting embodiment, the length extending from the first end in the direction of the last sensor unit. The length of the transducer must merely be sufficient to cause a threshold value to be exceeded within the sensor unit when the transducer is located above the sensor unit.

When the first end is above the first sensor unit, the first sensor unit detects an exceeding of the limit value and the switching output of the first sensor unit is switched to the Off-state so that all subsequent sensor units are switched off. If the first end of the transducer moves over the second sensor unit, the first sensor unit detects a threshold value falling short and switches on the immediately following second sensor unit. Thus, all successive sensor units are always switched on from the first sensor unit to the sensor unit above which the first end of the transducer is located. The multiplier of the power consumption, which can be determined by means of the measured aggregate current, thus indicates the number of the sensor unit in the row of sensor units arranged along the path and above which the first end of the transducer is located.

The position of the first end of the transducer can be set between a position 1 above the first sensor unit (switching output of the first sensor unit in the Off-state, Isum=1*Isup) and a position PN of the last sensor unit (switching output of the penultimate sensor unit in the On-state, Isum=N*Isup).

In an embodiment for increasing the accuracy of the position determination, each sensor unit has at least a first threshold value and a second threshold value, and the transducer extends from the first end at least along a partial area of the path in the direction of the last sensor unit, wherein the second threshold value is smaller than the first threshold value, the Off-state of the switching output of each sensor unit is switched when the first threshold value is exceeded, the On-state of the switching output of each sensor unit is switched when the second threshold value falls short, the Off-state of the switching output of each sensor unit is switched in a pulse-width-modulated manner for sensor signals located between the first threshold value and the second threshold value, the duty cycle of the pulse width modulation is inversely proportional to the sensor signal, the power consumption Ipwm is a sensor unit connected to the pulse-width-modulated switching output which is proportional to the duty cycle and smaller than the power consumption Isup in the On-state, a position of the first end of the transducer in the region of the position of the m-th sensor unit corresponds to an aggregate current Isum=(m−1)*Isup+Ipwm.

The embodiment described above represents an inverting, pulse-width-modulated embodiment, i.e. in the absence of the transducer, all sensor units are switched on, and the transducer causes the sensor units to be switched off, wherein a position within a region located above a sensor unit is resolved by means of the pulse width modulation. Correspondingly, the preceding embodiments apply with respect to a pulse width modulation of the signal output of the sensor units and with respect to an inverted operation of the sensor units.

According to an embodiment, the power consumption Isup of the sensor units has a variance of at most 10% and/or the power consumption of each sensor unit is stabilized or trimmed in order to ensure a particularly reliable, error-free position determination. In an embodiment, the intervals between sensor units are the same for simplifying the evaluation.

According to an embodiment, the first end of the transducer is designed as a tip or as an edge and/or a distance of the transducer from the path is constant along the entire length of the transducer or at least increases in the region of the first end. By means of a tapered first end or a first end bent away from the sensor units, in particular the accuracy of the relative position determined by means of pulse width modulation can be increased within a region located above a single sensor unit, and an output characteristic can be linearized.

In an embodiment, the sensor units are Hall sensors, wherein the at least one magnetic field sensor is a laterally measuring Hall plate or a Hall plate measuring vertically. Suitable sensor units are, for example, 3-wire Hall switches or 3-wire linear sensor units with a pulse width modulation output. Magnetoresistive sensors can also be used as magnetic field sensors.

According to an embodiment, the switching output has an open-drain transistor, wherein a current-carrying capacity of the open-drain output of the open-drain transistor is preferably at least 100 mA and/or an input resistance of the open drain transistor is preferably at most 100 mΩ. In order to ensure the input of all switched-on sensor units into the aggregate current to be measured, even with a high number of sensor units, the current-carrying capacity of the open-drain transistors of the sensor units must be as great as possible. In order to be able to utilize as low a supply voltage as possible, even with a large number of sensor units, the input resistance of the open-drain transistor must not be too high.

In an embodiment, the last sensor unit is replaced by a resistor. A defined power level is achieved by adjusting the value of the resistor to the supply voltage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
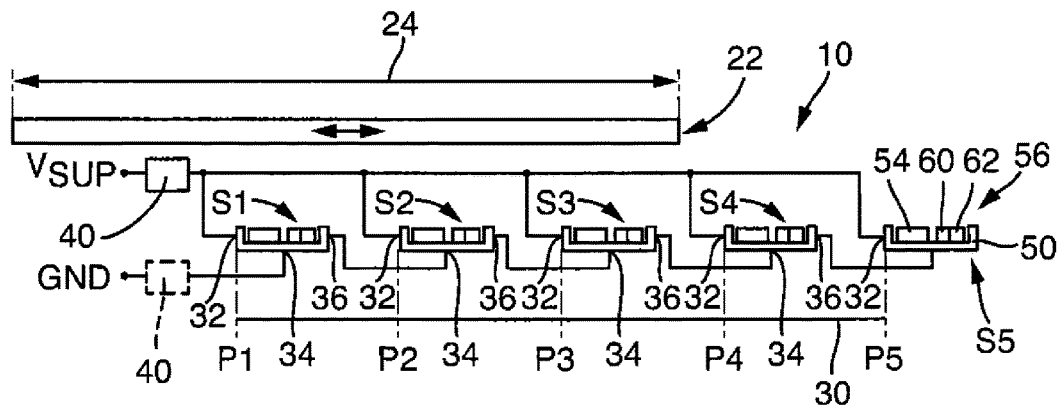
FIG. 1 is a schematic view of an embodiment of a position determining unit according to the invention with sensor units.

The diagram of FIG. 1 shows a schematic view of an inventive position determining unit 10, comprising a number N=5 of similar sensor units Sn=1 . . . N, a transducer 20 and a current measuring unit 40.

The sensor units are arranged along a path 30 at even intervals 32 at positions Pn=1 . . . N, wherein a first sensor unit S1 is arranged at a beginning of the path and a last sensor unit SN is arranged at one end of the path 30.

Each sensor unit Sn has a supply voltage connection 32, a second supply voltage connection 34 and a switching output 36, wherein the switching output 36 has an On-state and an Off-state.

In the illustrated exemplary embodiment, as a function of a first threshold value, the switching output 36 of each sensor unit Sn switches to the On-state when a threshold value exceeds the sensor signal of the sensor unit Sn, and to the Off-state when the first threshold value falls short.

Furthermore, each sensor unit Sn has a carrier 50 with a surface 52, a measuring unit 54 arranged on the surface 52 and a bias magnet 56 arranged on the surface 52 with a first pole 60 and a second pole 62. The bias magnet 56 is arranged in a first direction pointing from the beginning of the path to the end of the path 30, in each case behind the measuring unit 54 of the sensor unit, and oriented such that the first pole 60 is arranged in the first direction before the second pole 62. Carrier 50, measuring unit 54 and bias magnet 56 are shown schematically in a plan view in FIG. 2. In the illustrated embodiment of FIG. 2, the measuring unit 54 also has two spaced-apart magnetic field sensors 54.1 and 54.2.

The first supply voltage connection 32 of the first sensor unit S1 is connected to a supply voltage Vsup, and the second supply voltage connection 34 of the first sensor unit S1 is connected to a reference potential GND, so that the first sensor unit S1 is always switched on during commissioning of the position determining unit 10, therefore always having a power consumption Isup.

All further sensor units Sn=2 . . . N are also connected by means of the respective supply voltage connection 32 to the supply voltage Vsup. The second supply voltage connection 34 of the further sensor units Sn=2 . . . N is connected in each case to the switching output 36 of the sensor unit Sn−1 immediately preceding on the path 30. As a result, the further sensor units Sn=2 . . . N are switched in each case by means of the immediately preceding sensor unit Sn−1, on the basis of exceeding the threshold value detected by the immediately preceding signal sensor unit. Such an interconnection is also referred to as a daisy chain. In the switched-on state, the further sensor units Sn=2 . . . N each also have a power consumption Isup, wherein the respective power consumption of all sensor units Sn exhibits low variance due to the uniformity of the sensor units.

To reduce costs, the last sensor unit SN can also be designed as a more cost-effective power consumer, e.g. as a resistor with a resistance value adapted to the supply voltages and without a connection corresponding to the switching output.

The transducer 20 is made of a ferromagnetic material or comprises a ferromagnetic material and has a first end 22 and a length 24. The transducer 20 is moveable parallel to the path 30, wherein as a result thereof, the first end 22 also moves along the entire path 30 and the length 24 of the transducer 22 is greater than or equal to the length of the path 30.

In the exemplary embodiment shown, the current measuring unit 40 is looped into the line of the first supply voltage Vsup, immediately before a first voltage node of the first sensor S1. Alternatively, the current measuring unit 40 can also be looped into the line for the reference potential GND before the second supply voltage connection 34—shown by dashed lines.

In both embodiments, an aggregate current Isum can be determined by means of the current measuring unit 40 in a simple manner, wherein the aggregate current is derived from the power consumption Isup of all switched-on sensors Sn. The aggregate current Isum thus corresponds to one multiple m of the power consumption Isup of a single sensor Sn:

$$I\text{sum} = m * I\text{sup}$$

In the illustrated exemplary embodiment, from the following equation using the measurable factor F1, it is possible to determine over which sensor unit Sn the first end 22 of the transducer 20 is located:

$$n = m - 1$$

Thus, the first end 22 is at the position Pm−1 of the (m−1)-th sensor unit Sm−1.

If the first end 22 of the transducer 20 is, as shown in the exemplary embodiment, above the third sensor unit S3, i.e., at the position P3 of the third sensor unit S3, then the transducer 20 covers the sensor units S1, S2 and S3. The respective sensor signal for the sensor units S1, S2, S3 is above the first threshold value; the respective switching output is switched to the On-state so that the sensor units S1 to S4 are in the switched-on state. Only sensor unit S5 is still in a switched-off state. Thus, the four sensor units contribute to the aggregate current Isum; the factor m is thus four.

To increase the accuracy of the position determination, according to a further development the sensor units $Sn=1 \ldots N$ each have a second threshold value, the second threshold value being smaller than the first threshold value. When the first threshold value is exceeded, the switching output of each sensor unit is switched to the On-state. When the second threshold value falls short, the switching output is in each case switched to the Off-state. For sensor signals located between the first threshold value and the second threshold value, the switching output is switched from the Off-state to the On-state in a pulse-width-modulated manner. The pulse width modulation has a duty cycle which is proportional to the sensor signal of the respective sensor unit.

The power consumption Ipwm of a sensor unit Sn switched in a pulse-width-modulated manner, i.e. of a sensor unit Sn which is connected to a pulse-width-modulated switching output of an immediately preceding sensor unit Sn−1, is less than the power consumption Isup of a fully switched-on sensor unit Sn. Due to the proportionality of the duty cycle of the pulse width modulation to the sensor signal, the power consumption Ipwm of the pulse-width-modulated sensor unit is also proportional to the sensor signal, and thus proportional to the position of the first end 22 of the sensor in the region above the preceding sensor unit Sn−1. As a result, the position Pp of the first end 22 of the transducer 20 is more precisely resolved in the region of a single sensor unit.

When the first end 22 is located above the third sensor unit, as shown in FIG. 1, for the embodiment variant with pulse width modulation, the aggregate current Isum is composed of the power consumption Isup of the fully switched-on sensor units S1, S2, S3 and the power consumption Ipwm of the sensor unit S4 since the sensor unit S4 is not switched on completely, but is switched on, accordingly pulse-width-modulated, by the pulse-width modulated switching output of the sensor unit S3. The sensor unit S5 does not contribute to the aggregate current Isum:

$$Isum=3*Isup+Ipwm$$

Consequently, based on the multiple m of the power consumption Isup, here three, one can read off above which sensor unit Sn the first end 22 of the transducer is located. By mapping all possible values of the current Ipwm to a path corresponding to a width of a sensor unit along the path or to the distance between two sensor units, and by determining the measured current Ipwm proportion of the width or path, the position of the first end 22 of the transducer 20 in the region of the third sensor unit can be more precisely determined.

Figure 6:
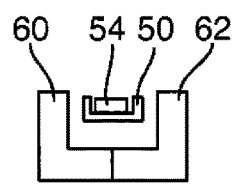
FIG. 6 is a schematic view of an embodiment of a position determining unit according to the invention.

FIGS. 3 to 6 show alternative embodiments of the sensor units. In the following, only the differences from the illustration of FIG. 1 are explained. In the embodiment shown in FIG. 3, the first pole 60 and the second pole 62 are arranged one behind the other in a direction perpendicular to the path and are thus located at the same level with respect to the path 30. In the embodiment shown in FIG. 4, the bias magnet 56 is arranged adjacent to the measuring unit in a first direction pointing from the beginning of the path to the end of the path, the first pole being arranged in the first direction before the second pole. The bias magnet 56 of the embodiment shown in FIG. 5 has a U-shaped first pole 60, the U-shape being formed by two side walls extending in a parallel manner and a base connecting the two side walls. The second pole 62 is disposed on the base. That is, the entire bias magnet is U-shaped, wherein the side walls and a part of the base adjacent to the side walls form the first pole 60, while a part of the base facing away from the side walls form the second pole 62. The carrier 50 with the measuring unit 54 is positioned completely between the side walls, and the surface of the carrier is aligned perpendicular to the side walls and parallel to the base. The bias magnet of the embodiment shown in FIG. 6 is also U-shaped, wherein a first side wall and a first part of a base adjacent to the first side wall form the first pole 60, and a second side wall and a second part of the base adjoining the second side wall form the second pole 62. The carrier 50 with the measuring unit 54 is arranged completely between the first and the second side wall, wherein the surface of the carrier is aligned parallel to the base and perpendicular to the side walls.

Figure 7:
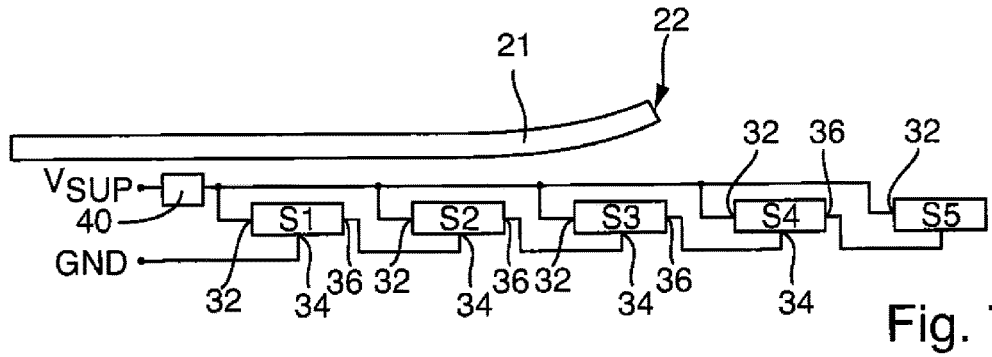
FIG. 7 is a schematic view of an embodiment of a position determining unit according to the invention.
Figure 8:
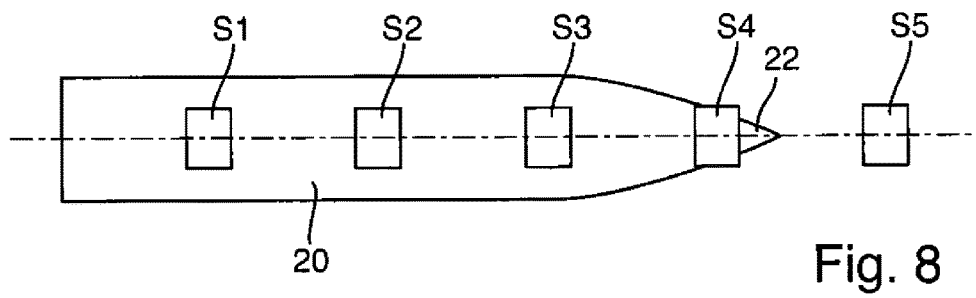
FIG. 8 is a schematic view of an embodiment of a position determining unit according to the invention.

FIGS. 7 and 8 show advantageous further developments of the transducer shown in FIG. 1. In the following, only the differences from FIG. 1 are explained. For the sake of clarity, the sensor units Sn are shown in simplified form.

Figure 2:
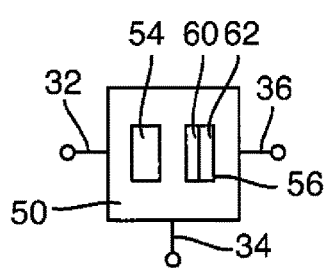
FIG. 2 is a schematic plan view of a sensor unit.
Figures 3, 4, 5:
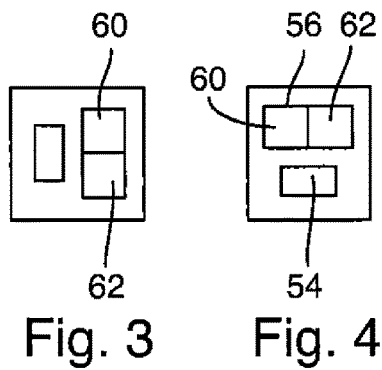
FIG. 3 is an embodiment of a sensor unit.
FIG. 4 is an embodiment of a sensor unit.
FIG. 5 is an embodiment of a sensor unit.

While the transducer 20 shown in FIG. 1 has a constant distance to path 30, the distance of the transducer 20 shown in FIG. 2 increases in the direction of the first end 22, since the transducer 20 is bent in an area before the first end 22.

In FIG. 8, a position determining unit 10 is sketched in a plan view. For better clarity, only the transducer 20 and the sensor units Sn are shown. The transducer 20 shown in FIG. 8 has a tapering first end 22.

The embodiments of the first end 22 of the transducer 20 shown in FIGS. 7 and 8 make it possible to increase the accuracy of the position determination in a pulse-width-modulated operation.

Figure 9:
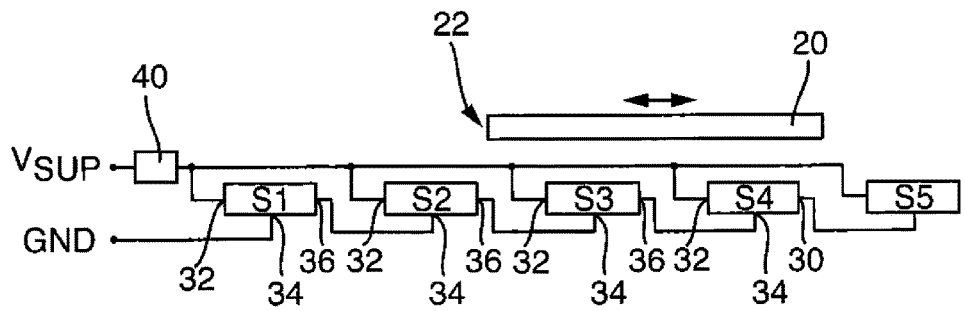
FIG. 9 is a schematic view of an embodiment of the position determining unit.

FIG. 9 shows a further embodiment of a position determining unit, wherein the sensor units Sn are illustrated in simplified form. In the following, only the differences from the illustration of FIG. 1 are explained. The illustrated sensor units Sn are inverting, so that the switching outputs of the sensor units each switch into the Off-state when the first threshold value is exceeded, and into the On-state, when the first threshold value falls short.

The transducer 20 extends from the first end 22 in the direction of the last sensor unit SN, wherein the length 24 of the transducer 20 covers only a partial region of the path 30.

In the absence of the transducer 20, all sensor units Sn are in the switched-on state, since the first threshold value falls short for each sensor unit Sn and the output signal 36 is switched to the On-state.

If the first end 22 of the transducer is located in a region of an m-th sensor unit, e.g. as shown in the region of the third sensor unit S3, i.e. at the position P3, the sensor signal of the third sensor unit S3 exceeds the first threshold value, and the output signal 36 of the third sensor unit S3 is switched to the Off-state. As a result, all subsequent sensor units S4, S5 are in the switched-off state and have no power consumption Isup. Only the power consumption Isup of the sensor units S1 and S2 running along the path contributes to the aggregate current Isum. Thus, by means of the factor m of Isum=m*Isup, the sensor unit Sn or the position Pn of the sensor unit Sn, on which the first end 22 of the transducer 20 is located, can be determined as follows:

$$n=m$$

The pulse width modulation described with regard to the exemplary embodiment according to FIG. 1, the embodiments of the sensor units Sn illustrated in FIGS. 3 to 6, and the embodiments of the first end of the transducer described in FIGS. 7 and 8 for increasing the accuracy of the position determinations are equally possible in the inverted mode illustrated in FIG. 9.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A position determining unit comprising:
a current measuring unit;
a plurality of sensor units arranged at predetermined intervals on positions along a path; and
a transducer being movable along the path, the transducer having a first end and a length extending from the first end in parallel to the path, the transducer being formed of a ferromagnetic material,
wherein each sensor unit comprises a carrier, a first supply voltage connection, a second supply voltage connection, a measuring unit with a switching output, and a bias magnet,
wherein the measuring unit has at least one magnetic field sensor to provide a sensor signal as a function of a measuring signal of the at least one magnetic field sensor, the measuring unit being arranged with a lower side on a top side of the carrier,
wherein the bias magnet has a first pole and a second pole,
wherein the switching output is switched into an On-state or an Off-state as a function of the sensor signal exceeding or falling below a threshold value,
wherein the first supply voltage connection of each sensor unit is connected to a supply voltage, when each sensor unit is switched on by the switching output, the supply voltage flows to the sensor unit switched on,
wherein a first sensor unit is arranged at a beginning of the path,
wherein a last sensor unit is arranged at one end of the path opposite the beginning of the path,
wherein the second supply voltage connection of the first sensor unit is connected to a reference potential, and the first sensor unit has a power consumption,
wherein the second supply voltage connection of each further sensor is connected to the switching output of a preceding sensor unit, and the respective further sensor unit is switched on or off via the switching output of the preceding sensor unit, and the respective further sensor unit has a power consumption in the switched-on state,
wherein the current measuring unit is arranged before the first supply voltage connection of the first sensor unit or before the second supply voltage connection of the first sensor unit,
wherein the power consumption of all switched-on sensor units contribute to an aggregate current measured via the current measuring unit, and
wherein the aggregate current is a multiple of the power consumption of all switched-on sensor units and is proportional to a position of the first end of the transducer.

2. The position determining unit according to claim 1, wherein the bias magnet of each sensor unit is arranged in a first direction pointing from the beginning of the path to the end of the path, before or after the measuring unit on the surface of the carrier, and wherein the first pole and the second pole are arranged along the first direction or perpendicular to the first direction.

3. The position determining unit according to claim 1, wherein the bias magnet is arranged in a second direction, which is formed substantially perpendicular to a first direction pointing from the beginning of the path to the end of the path, before or after the measuring unit on the surface of the carrier, and wherein the first pole and the second pole are arranged along the path or substantially perpendicular to the second direction.

4. The position determining unit according to claim 1, wherein the bias magnet of each sensor unit is U-shaped with two side walls running parallel to one another and with a base connecting the two side walls, wherein the two side walls and a part of the base adjoining the side walls form the first pole and a second part of the base facing away from the side walls form the second pole, and wherein the carrier and the measuring unit are arranged completely between the side walls and wherein the surface of the carrier is oriented substantially perpendicular to the side walls.

5. The position determining unit according to claim 1, wherein the bias magnet of each sensor unit is U-shaped with a first side wall, a second side wall running parallel to the first, and a base connecting the first and the second side wall, wherein the first side wall and a first part of the base adjoining the first side wall form the first pole and the second side wall and a second part of the base adjoining the second side wall form the second pole, wherein the carrier and the measuring unit are arranged completely between the first and the second side wall, and wherein the surface of the carrier is oriented substantially perpendicular to the first and the second side walls.

6. The position determining unit according to claim 1, wherein the On-state of the switching output of each sensor unit is switched when a first threshold value is exceeded, wherein the Off-state of the switching output of each sensor unit is switched when the first threshold value falls short and the length of the transducer extends from the first end at least up to the first sensor unit, and wherein the position of the first end of the transducer in the region of the position of the m-th sensor unit corresponds to an aggregate current (Isum): Isum=(m+I)*Isup, where Isup is a supply current of the first supply voltage connection.

7. The position determining unit according to claim 1, wherein each sensor unit has at least the first threshold value and a second threshold value, wherein the length of the transducer extends from the first end to at least the first sensor unit, wherein the second threshold value is less than the first threshold value, wherein the On-state of the switching output of each sensor unit is switched when the first threshold value is exceeded, wherein the Off-state of the switching output of each sensor unit is switched when the second threshold value falls short, wherein the On-state of the switching output of each sensor unit is pulse-width-modulated for sensor signals lying between the second threshold value and the first threshold value, wherein a duty cycle of the pulse width modulation is proportional to the sensor signal, wherein the power consumption of a sensor unit connected to the pulse-width-modulated switching output is proportional to the duty cycle and smaller than the power consumption in the On-state, and wherein a position of the first end of the transducer in the region of the position of the m-th sensor unit corresponds to an aggregate current (Isum): Isum=m*Isup+Ipwm, where Isup is a supply current of the first supply voltage connection and Ipwm is a current supply proportional to the duty cycle of the pulse width modulation.

8. The position determining unit according to claim 1, wherein the Off-state of the switching output of each sensor unit is switched when a first threshold value is exceeded, wherein the On-state of the switching output of each sensor unit is switched when the first threshold value is undershot, and wherein the transducer extends from the first end at least along a partial region of the path in the direction of the last sensor unit, and wherein a position of the first end of the transducer in the region of the position of the m-th sensor unit corresponds to an aggregate current (Isum): Isum=m*Isup, where Isup is a supply current of the first supply voltage connection.

9. The position determining unit according to claim 1, wherein, in order to increase the accuracy of the position determination, each sensor unit has at least a first threshold value and a second threshold value, and the transducer extends from the first end at least along a partial region of the path in the direction of the last sensor unit, wherein the second threshold value is less than the first threshold value, wherein the Off-state of the switching output of each sensor unit is switched when the first threshold value is exceeded, wherein the On-state of the switching output of each sensor unit is switched when the second threshold value falls short, wherein the Off-state of the switching output of each sensor unit is pulse-width-modulated for sensor signals lying between the first threshold value and the second threshold value, wherein the duty cycle of the pulse width modulation is inversely proportional to the sensor signal, wherein the power consumption Ipwm of a sensor unit connected to the pulse-width-modulated switching output is proportional to the duty cycle and less than the power consumption Isup in the On-state, and wherein a position of the first end of the transducer in a region of the position of the m-th sensor unit corresponds to an aggregate current (Isum): Isum=m*Isup+Ipwm, where Isup is a supply current of the first supply voltage connection and Ipwm is a current supply proportional to the duty cycle of the pulse width modulation.

10. The position determining unit according to claim 1, wherein the power consumption of the sensor units has a mutual variance of at most 10%.

11. The position determining unit according to claim 1, wherein the power consumption of each sensor unit is stabilized or trimmed.

12. The position determining unit according to claim 1, wherein the intervals between sensor units are substantially identical.

13. The position determining unit according to claim 1, wherein the first end of the transducer is designed as a tip or as an edge.

14. The position determining unit according to claim 1, wherein a distance of the transducer from the path along an entire length of the transducer is constant or at least increases in the region of the first end.

15. The position determining unit according to claim 1, wherein the sensor units are Hall sensors, and wherein the magnetic field sensor is a laterally measuring Hall plate or a Hall plate measuring vertically.

16. The position determining unit according to claim 1, wherein the switching output has an open-drain transistor.

17. The position determining unit according to claim 16, wherein a current-carrying capacity of an open-drain output of the open-drain transistor is at least 100 mA.

18. The position determining unit according to claim 16, wherein an input resistance of the open-drain transistor is at most 100 mΩ.

19. The position determining unit according to claim 1, wherein the last sensor unit is a resistor.

20. The position determining unit according to claim 1, wherein the sensor units are identical or substantially identical to one another.

* * * * *